United States Patent [19]
Russell

[11] 3,821,700
[45] June 28, 1974

[54] WARNING SYSTEM INDICATING CONCURRENT ACTUATION OF ACCELERATOR AND BRAKE CONTROLS

[76] Inventor: Ernest R. Russell, 1215 Central Pky., Florissant, Mo. 63031

[22] Filed: July 26, 1973

[21] Appl. No.: 382,970

[52] U.S. Cl. ............................ 340/66, 340/52 F
[51] Int. Cl. .......................................... B60q 1/26
[58] Field of Search ......... 340/52 R, 52 B, 52 F, 66, 340/262, 71, 78

[56] References Cited
UNITED STATES PATENTS
| | | | |
|---|---|---|---|
| 2,957,161 | 10/1960 | Daws | 340/66 X |
| 3,478,312 | 11/1969 | Lee | 340/72 X |
| 3,676,844 | 7/1972 | Hendrickson | 340/66 X |

Primary Examiner—Donald J. Yusko
Attorney, Agent, or Firm—Koening, Senniger, Powers and Leavitt

[57] ABSTRACT

A warning system for a vehicle having an acceleration control means and a braking control means for providing indication of concurrent actuation of both of the means. A first switch closes in response to actuation of the brake control means while a second switch closes in response to actuation of the acceleration control means. Indicator means provide a warning signal when energized by a source of electrical power. An electrical circuit includes both of the switching means series-connected between the power source and the indicator means so that upon concurrent actuation of the brake control means and the acceleration control means a warning is provided by the indicator means.

3 Claims, 3 Drawing Figures

WARNING SYSTEM INDICATING CONCURRENT ACTUATION OF ACCELERATOR AND BRAKE CONTROLS

BACKGROUND OF THE INVENTION

This invention relates to vehicle warning systems and more particularly to a vehicle warning system for indication of concurrent actuation of the accelerator and the braking control means.

Some drivers, especially those whose vehicles are equipped with an automatic transmission, have a habit of driving with their left foot resting on the brake pedal. Other drivers place their foot on the brake pedal while tail-gating another car thinking they can stop more quickly. In either instance the driver, besides causing excessive wear of the brake linings and premature burn-out of the brake lights, creates a dangerous situation in that with his brake lights burning all the time, drivers behind him have no warning of a sudden stop with the possible consequence of a rear end or chain reaction collision.

Electrical warning systems have been used on vehicles for many years to indicate various engine conditions, leaving a key in the ignition switch, a turn signal lamp being burnt out, etc. Warning systems often required modification of existing components, such as a redesigned ignition switch for a key warning system, or required factory installation due to calibration requirements or the need for special installation tools. A variety of kit-type warning systems also have been available in the past, but often these systems have not been designed to take full advantage of existing vehicle components (switches, lights, etc.) and have included new parts thereby increasing the cost of the kit.

SUMMARY OF THE INVENTION

Among the several objects of this invention may be noted the provision of a vehicle warning system which indicates concurrent actuation of the accelerator and the brake control means; the provision of such a warning system which is easily installed; and the provision of such a warning system utilizing existing vehicle components thereby decreasing the cost of the total system.

Briefly, a warning system for a vehicle having an acceleration control means and a braking control means provides indication of concurrent actuation of both the means. The system includes a first switching means adapted to be actuated to a circuit-making mode in response to actuation of the brake control means, a second switching means adapted to be actuated to a circuit-making mode in response to actuation of the acceleration control means, and a source of electrical power. It also includes an indicator means adapted to provide a warning signal when electrically energized and an electrical circuit including both switching means series-connected between the power source and the indicator means so that upon concurrent actuation of the brake control means and the acceleration control means a warning is provided by the indicator means.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
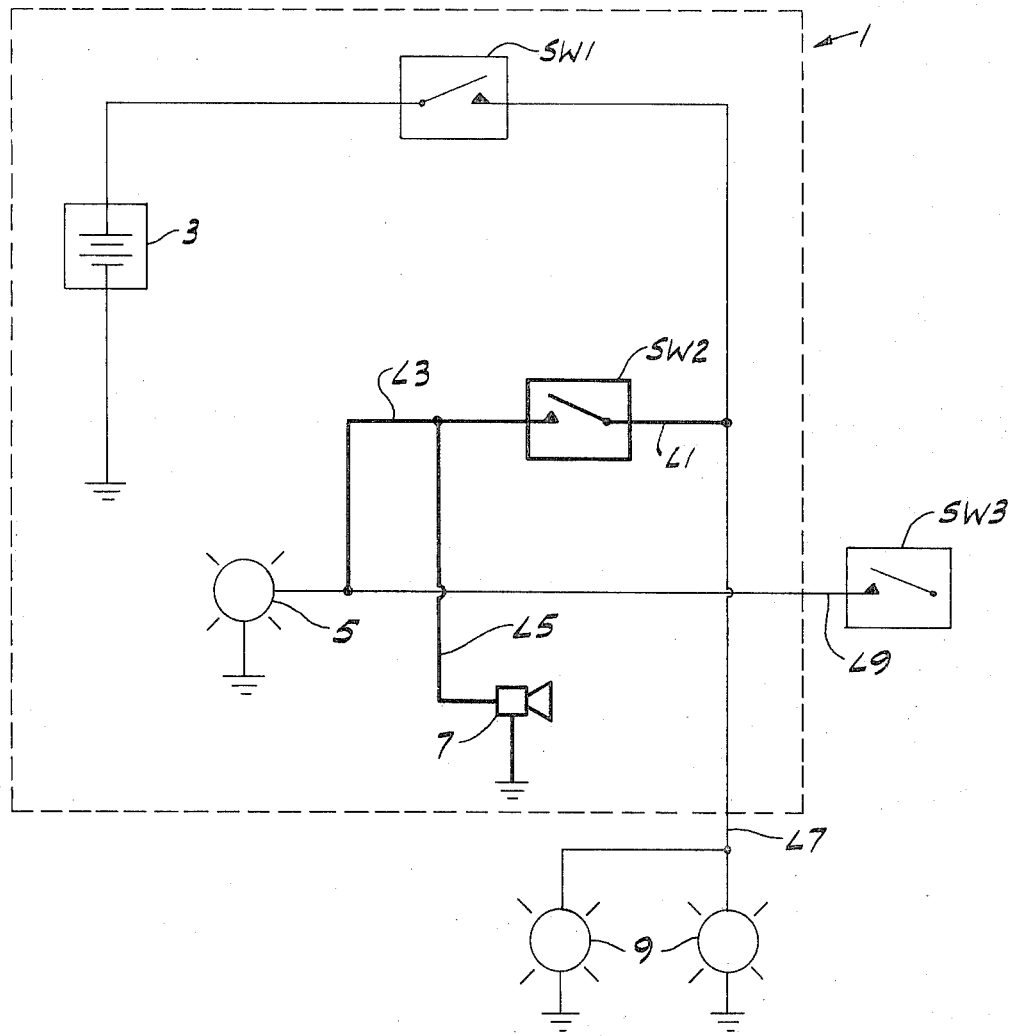
FIG. 1 is a schematic diagram of the present invention.

Referring now to FIG. 1, a vehicle warning system 1 of the present invention is adapted for use with an automotive vehicle having an acceleration control means, such as a gas pedal or accelerator, and a braking control means, such as a brake pedal. The system includes an electrical power source 3, a switch SW1 positioned to close in response to actuation of the brake pedal, a switch SW2 positioned to close in response to actuation of the gas pedal, and an indication means, shown in FIG. 1 as comprising a lamp 5 for visual indication and an alarm 7 for aural indication. Both switches are series-connected between the power source and the lamp and alarm so that upon concurrent actuation of the brake pedal and the gas pedal both a visual and aural warning is provided to the operator of the vehicle. The power source, lamp, and alarm are suitably grounded to provide a return path.

It most installations, only that portion of the circuitry of FIG. 1 drawn with bold lines need be added to existing vehicle circuitry. The new components required are switch SW2, alarm 7, a lead L1 connecting the switches, and a pair of leads L3,L5 connecting switch SW2 with lamp 5 and horn 7 respectively. The primary function of switch SW1, connected by a lead L7 to a pair of tail lights 9, is to indicate the brakes are being applied. It is usually of the hydraulically operated variety, being adapted to close in response to pressure in the brake line reaching a predetermined magnitude. Lamp 5 is preferably the brake system warning lamp, connected by a lead L9 to a brake system warning switch SW3, which indicates a brake system failure. Of course, switch SW3, tail lights 9 and leads L7 and L9 form no part of this invention and are only discussed to illustrate the primary functions of switch SW1 and lamp 5.

Figure 2:
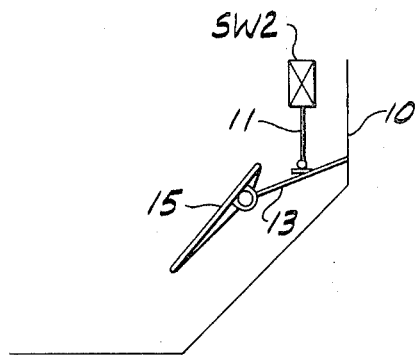
FIGS. 2 and 3 show mounting arrangements of the gas pedal switch in relation to the vehicle's firewall.
Figure 3:
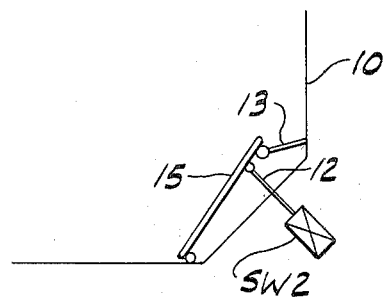

FIGS. 2 and 3 show two alternate installations of gas pedal switch SW2 in relation to a vehicle's firewall 10. In FIG. 2, switch SW2 is mounted underneath the dashboard (not shown). Switch SW2 has an actuating arm 11 contacting a linkage arm 13 to which a gas pedal 15 is attached. As gas pedal 15 is depressed, actuating arm 11 drops causing switch SW2 to close. In FIG. 3, switch SW2 is mounted below the inclined portion of the firewall with gas pedal 15 contacting an actuating arm 12. Switch SW2 may also be mounted in the engine compartment so as to be actuated by movement of the accelerator-carburetor linkage.

This warning system is not limited for use on automobiles but also may advantageously be applied to motorcycles, trucks, or any vehicle having separate acceleration and braking control means.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A warning system for a vehicle having an acceleration control means and a braking control means and adapted to provide indication of concurrent actuation of both of said means comprising:
   first switching means adapted to be actuated to a circuit-making mode in response to actuation of said brake control means;
   second switching means adapted to be actuated to a circuit-making mode in response to actuation of said acceleration control means;
   a source of electrical power;
   indicator means adapted to provide a warning signal when electrically energized; and
   an electrical circuit including both said switching means series-connecting between said power source and said indicator means whereby upon concurrent actuation of said brake control means and said acceleration control means a warning is provided by said indicator means.

2. The warning system as set forth in claim 1 in which said indicator means comprises a brake warning light and an audible alarm.

3. In an automotive vehicle having a brake warning light, a braking control means, an acceleration control means, a source of electric power, and a first switching means connected to said power source and adapted to be actuated to a circuit-making mode in response to actuation of said braking control means; a warning system comprising:
   a second switching means adapted to be actuated to a circuit-making mode in response to actuation of said acceleration control means;
   an audible alarm adapted to provide a warning signal when electrically energized; and
   an electrical circuit adapted to connect both said light and said alarm to the first switching means through the second switching means whereby upon concurrent actuation of said braking control means and said acceleration control means visual and audible warning signals are provided by said light and alarm to an operator of said vehicle.

* * * * *